United States Patent
Xiao et al.

(10) Patent No.: US 11,144,823 B1
(45) Date of Patent: Oct. 12, 2021

(54) METHOD AND SYSTEM FOR HIERARCHICAL WEIGHT-SPARSE CONVOLUTION PROCESSING

(71) Applicant: MOFFETT TECHNOLOGIES CO., LIMITED, Central (HK)

(72) Inventors: Zhibin Xiao, Los Altos, CA (US); Enxu Yan, Los Altos, CA (US); Wei Wang, Los Altos, CA (US); Yong Lu, Los Altos, CA (US)

(73) Assignee: MOFFETT TECHNOLOGIES CO., LIMITED, Central (HK)

( * ) Notice: Subject to any disclaimer, the term of this patent is extended or adjusted under 35 U.S.C. 154(b) by 0 days.

(21) Appl. No.: 17/222,623

(22) Filed: Apr. 5, 2021

Related U.S. Application Data

(63) Continuation of application No. 16/999,455, filed on Aug. 21, 2020, now Pat. No. 10,970,619.

(51) Int. Cl.
*G06N 3/063* (2006.01)
*G06N 3/04* (2006.01)
*G06N 3/08* (2006.01)

(52) U.S. Cl.
CPC .............. *G06N 3/063* (2013.01); *G06N 3/04* (2013.01); *G06N 3/082* (2013.01)

(58) Field of Classification Search
CPC ........... G06N 3/06; G06N 3/063; G06N 3/082
See application file for complete search history.

(56) References Cited

U.S. PATENT DOCUMENTS

2019/0251436 A1  8/2019  Son et al.
2019/0340510 A1  11/2019  Li et al.
2020/0202199 A1  6/2020  Lee et al.

OTHER PUBLICATIONS

Albericio, Jorge et al.; Cnvlutin: Ineffectual-Neuron-Free Deep Neural Network Computing; 2016 IEEE; 2016 ACM/IEEE 43rd Annual International Symposium on Computer Architecture; pp. 1-13 (Year: 2016).*
Zhang, Shijin et al.; Cambricon-X: An Accelerator for Sparse Neural Networks; 2016 IEEE; 12 pages. (Year: 2016).*
Kim, Dongyoung et al.; A Novel Zero Weight/Activation-Aware Hardware Architecture of Convolutional Neural Network; 2017 IEEE; pp. 1462-1467. (Year: 2017).*

(Continued)

*Primary Examiner* — Stanley K. Hill

(57) ABSTRACT

Methods, systems, and apparatus, including computer programs encoded on computer storage media, for hierarchical weight-sparse convolution processing are described. An exemplary method comprises: obtaining an input tensor and a filter at a convolution layer of a neural network; segmenting the filter into a plurality of sub-filters; generating a hierarchical bit representation of the filter representing a plurality of non-zero weights in the filter, wherein the hierarchical bit representation comprises a first layer, the first layer comprising a plurality of bits respectively corresponding to the plurality of sub-filters in the filter, each of the plurality of bits indicating whether the corresponding sub-filter includes at least one non-zero weight; and performing multiply-and-accumulate (MAC) operations based on the hierarchical bit representation of the filter and the input tensor.

20 Claims, 9 Drawing Sheets

(56) References Cited

OTHER PUBLICATIONS

Chen, Yu-Hsin et al.; Eyeriss v2: A Flexible Accelerator for Emerging Deep Neural Networks on Mobile Devices; 2019 IEEE; Journal on Emerging and Selected Topics in Circuits and Systems, vol. 9, No. 2; pp. 292-308. (Year: 2019).*
Zhou, Xuda et al.; Addressing Sparsity in Deep Neural Networks; IEEE Transactions on Computer-Aided Design of Integrated Circuits and Systems, vol. 38, No. 10, Oct. 2019; pp. 1858-1871. (Year: 2019).*
Elsen et al., "Fast Sparse ConvNets", arVix 1911.09723, Nov. 2019, 12 pages.
Gale et al., "The State of Sparsity in Deep Neural Networks", arVix 1902.09574, Feb. 2019, 15 pages.
Parashar et al., "SCNN: An Accelerator for Compressed-sparse Convolution Neural Networks", arVix 1708.04485, May 2017, 12 pages.
Park et al., "Faster CNNs with Direct Sparse Convolutions and Guided Pruning", International Conference on Learning Representation 2017, 12 pages.
Liu et al., "Sparse Convolutional Neural Networks", CVPR 2015, IEEE Xplore, p. 806-814.

* cited by examiner

METHOD AND SYSTEM FOR HIERARCHICAL WEIGHT-SPARSE CONVOLUTION PROCESSING

CROSS REFERENCE TO RELATED APPLICATION

This application is a continuation of U.S. patent application Ser. No. 16/999,455, filed on Aug. 21, 2020, the contents of which are hereby incorporated by reference in the entirety.

TECHNICAL FIELD

The disclosure relates generally to artificial intelligence, more particularly to hierarchical weight-sparse convolution processing.

BACKGROUND

Neural networks (NN) are currently the foundation for many modern artificial intelligence (AI) applications such as image and video recognition, recommender systems, classification, medical image analysis, and natural language processing. NNs are employed in various usage scenarios from self-driving cars and detecting cancer to playing complex games. A typical NN may comprise a series of convolution layers where intensive and therefore expensive (computational and energy-wise) convolution operations are performed.

In recent years, various approaches have been developed to improve the computational efficiency of NNs by introducing sparsity to the convolution processing in NNs, such as pruning the filters to reduce the number of non-zero weights. However, existing hardware architectures rely on general-purpose computing engines (e.g., GPUs) which are not optimized for convolution involving filters with sparse weights (e.g., limited numbers of non-zero weights). These architectures tend not to efficiently store the sparse filters in memory, or fully exploit the sparsity to reach higher levels of parallelism at large scale. Accordingly, it is desirable to build a novel system architecture for efficient sparse convolution.

SUMMARY

Various embodiments of the present specification may include systems, methods, and non-transitory computer-readable media for hierarchical weight-sparse convolution processing and parallelization.

According to one aspect, the method for hierarchical weight-sparse convolution comprises: obtaining an input tensor and a filter at a convolution layer of a neural network; segmenting the filter into a plurality of sub-filters; generating a hierarchical bit representation of the filter representing a plurality of non-zero weights in the filter, wherein the hierarchical bit representation comprises a first layer, the first layer comprising a plurality of bits respectively corresponding to the plurality of sub-filters in the filter, each of the plurality of bits indicating whether the corresponding sub-filter includes at least one non-zero weight; and performing multiply-and-accumulate (MAC) operations based on the hierarchical bit representation of the filter and the input tensor.

In some embodiments, the performing MAC operations comprises: identifying, based on the hierarchical bit representation, one or more of the plurality of non-zero weights in the filter and corresponding input values in the input tensor; and performing MAC operations on the one or more identified non-zero weights and the corresponding input values.

In some embodiments, the hierarchical bit representation further comprises a second layer, the second layer comprising a plurality of key-value pairs respectively corresponding to the plurality of non-zero weights in the filter, each key-value pair comprising one of the plurality of non-zero weights as value and a channel identifier of the one of the plurality of non-zero weights as key.

In some embodiments, the performing MAC operations comprises: for each of the plurality of non-zero weights, determining a channel group index based on the first layer of the hierarchical bit representation, wherein the channel group index corresponds to a filter channel group in which the non-zero weight is located; determining an offset of the non-zero weight within the filter channel group based on the second layer of the hierarchical bit representation; identifying an input value in the input tensor based on the channel group index and the offset; and performing an MAC operation based on the identified input value and the non-zero weight.

In some embodiments, the hierarchical bit representation further comprises a third layer, the third layer comprising a plurality of bit-vectors respectively corresponding to a plurality of horizontal planes in each of the plurality of sub-filters, wherein each of the plurality of bit-vectors indicates whether the corresponding horizontal plane comprises at least one of the plurality of non-zero weights.

In some embodiments, the performing MAC operations comprises: for each of the plurality of non-zero weights, determining a channel group index based on the first layer of the hierarchical bit representation, wherein the channel group index corresponds to a filter channel group in which the non-zero weight is located; determining a height index and a width index of the non-zero weight based on the third layer of the hierarchical bit representation; determining an offset of the non-zero weight within the filter channel group based on the second layer of the hierarchical bit representation; identifying an input value in the input tensor based on the channel group index, the height index, the width index, and the offset; and performing an MAC operation based on the identified input value and the non-zero weight.

In some embodiments, the method further comprises pruning the filter to make each of the plurality of sub-filters has either all zero weights or a prefixed number of non-zero weights.

In some embodiments, the method further comprises obtaining a plurality of partial sums from the MAC operations; and constructing an output tensor of the convolution layer of the neural network based on the plurality of partial sums.

In some embodiments, the MAC operations are parallel processed among a plurality of processors.

In some embodiments, the method further comprises segmenting the input tensor into a plurality of sub-tensors, wherein each of the plurality of sub-tensors and each of the plurality of sub-filters have a same number of channels, and the performing MAC operations comprises: assigning the plurality of sub-tensors and the plurality of sub-filters to a plurality of processors for parallelly performing MAC operations.

According to another aspect, a system for hierarchical weight-sparse convolution is provided. The system may comprise one or more processors and one or more non-transitory computer-readable memories coupled to the one or more processors and configured with instructions executable by the one or more processors to cause the system to perform operations comprising: obtaining an input tensor and a filter at a convolution layer of a neural network; segmenting the filter into a plurality of sub-filters; generating a hierarchical bit representation of the filter representing a plurality of non-zero weights in the filter, wherein the hierarchical bit representation comprises a first layer, the first layer comprising a plurality of bits respectively corresponding to the plurality of sub-filters in the filter, each of the plurality of bits indicating whether the corresponding sub-filter includes at least one non-zero weight; and performing multiply-and-accumulate (MAC) operations based on the hierarchical bit representation of the filter and the input tensor.

According to yet another aspect, a non-transitory computer-readable storage medium for hierarchical weight-sparse convolution is provided. The medium may be configured with instructions executable by one or more processors to cause the one or more processors to perform operations comprising: obtaining an input tensor and a filter at a convolution layer of a neural network; segmenting the filter into a plurality of sub-filters; generating a hierarchical bit representation of the filter representing a plurality of non-zero weights in the filter, wherein the hierarchical bit representation comprises a first layer, the first layer comprising a plurality of bits respectively corresponding to the plurality of sub-filters in the filter, each of the plurality of bits indicating whether the corresponding sub-filter includes at least one non-zero weight; and performing multiply-and-accumulate (MAC) operations based on the hierarchical bit representation of the filter and the input tensor.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

Figure 1:
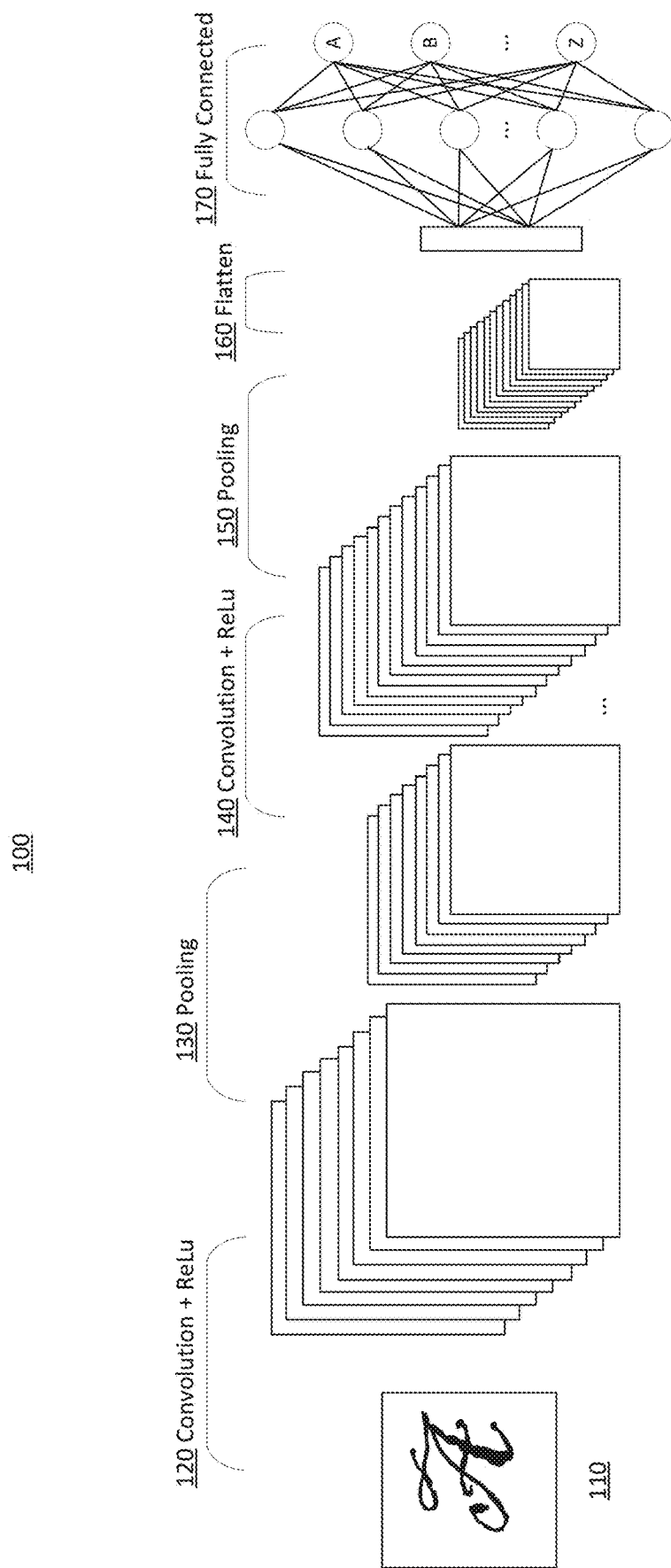
FIG. 1 illustrates an exemplary convolutional neural network (CNN) in accordance with various embodiments.

Embodiments described herein provide methods, systems, apparatus for hierarchical weight-sparse convolution in neural networks. A convolution process may refer to a fundamental but computationally expensive operation to extract features of input data from a previous layer, such as a feature map derived from an image or an audio wave, or activations output from a previous layer in a neural network. The input data to a convolution process may be referred to as an input tensor, and the output of the convolution process may be referred to as an output tensor. The input tensor may comprise multiple channels of feature maps. For example, an RGB image may be represented as an input tensor with three channels (red channel, green channel, and blue channel), with each channel comprising a feature map (e.g., a grayscale image of the same size as the original RGB image but made of just one of the red, green, or blue colors). To extract features from an input tensor, one or more feature extractors (also called filters) may be applied to the input tensor in a convolving (e.g., sliding or moving) manner. Multiplication and accumulation (MAC) operations between the feature detectors (filters) and the input tensor may be performed during each convolving step. The outputs generated from the convolving steps may be subsequently assembled to form an output tensor of the convolution process. The output tensor may become the input tensor of the next layer in the neural network. In some cases, multiple input tensors may be involved in a convolution layer.

During a convolution process, the filters may be pruned or sparsified by introducing a large number of zeros to reduce the computation cost and improve inferencing speed. For example, more than 50% of the values in the filters may be set to zeros. Some embodiments in this specification take advantage of the filter sparsity by efficiently storing the sparsified filters in a memory-efficient layout and parallelizing the convolution processing on a plurality of processing entities (PE) (e.g., processors).

In some embodiments, the input tensor may be first segmented into a plurality of sub-tensors according to the number of PEs that are available to participate in the convolution processing. Each of the sub-tensors may be assigned to one of the plurality of PEs and stay therein throughout multiple iterations of convolution process (corresponding to multiple convolution layers in a NN) without swapping out of the PE's local memory/buffer. After each iteration of convolution process, the sub-tensor assigned to the PE as an input may be updated and evolved into an output, which may be used as the input for the next iteration of convolution process. In some embodiments, the updated sub-tensor may be swapped out of the PE temporarily for memory management purposes, and swapped back in for the next iteration.

In some embodiments, each of the sparse filters may be segmented into a plurality of sub-filters that may be stored in a memory-efficient layout. For example, after being pruned and segmented, each of the sparse filters may be segmented in a way where each of the sub-filters comprises either all zero weights or a predefined number of non-zero weights denoted as W. The number of non-zero weights within each sub-filter may be affected by the size of the sub-filter (e.g., a larger size of sub-filter may include more non-zero weights) and the desired feature extraction accuracy (e.g., too few non-zero weights may cause feature loss). In some embodiments, based on the knowledge of the number of non-zero weights within each sub-filter (either 0 or W), each of the sparse filters may be represented in a hierarchical bit representation (e.g., a form of memory layout) with multiplier layers. For example, the top layer may include a plurality of bits to represent whether a plurality of blocks within the filter contain non-zero weights, a second layer may similarly include a plurality of bits to represent whether a plurality of sections within each of the blocks contain non-zero weights, and a bottom layer may store the actual non-zero weights. The number of the layers in each hierarchical bit representation may be determined based on, for example, how the filters are segmented.

Since the sparse filters are represented as hierarchical bit representations, the corresponding convolution processing may be referred to as a hierarchical weight-sparse convolution. The hierarchical bit representations of the filters may allow each of the PEs to store and iterate the non-zero weights more efficiently. For example, the hierarchical bit representations may significantly reduce the memory footprint of the filters (e.g., each PE may read less data from a global buffer into its local buffer to perform the local convolution) and make the solution suitable for devices with limited memory resources. For example, the embodiments disclosed herein may be applied to edge devices in edge computing systems. Detailed description regarding the hierarchical bit representation may refer to FIG. 4. In some embodiments, the sub-filters and the sub-tensors may be assigned to the plurality of PEs in a way that guarantees that the pairs of sub-tensor and sub-filter assigned to different PEs are independent from each other so that the plurality of PEs may execute the local operations in parallel to boost performance. Detailed description regarding the assignments may refer to FIGS. 6A and 6B.

The above described segmentation and parallel processing scheme is also highly scalable. In some embodiments, each round (also called iteration) of the parallel processing may generate a plurality of partial sums, and the plurality of PEs may perform the parallel processing for multiple rounds to accumulate the partial sums generated in each round and assemble the accumulated results as an output tensor. In some embodiments, the partial sums generated by each PE across the multiple rounds may be directly accumulated (within each PE) to generate a portion of the output tensor without the need to exchange data with other PEs.

In the following description, specific, non-limiting embodiments of the present invention will be described with reference to the drawings. Particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope, and contemplation of the present invention as further defined in the appended claims.

FIG. 1 illustrates an exemplary convolutional neural network (CNN) in accordance with various embodiments. CNN is widely used in a variety of applications including image understanding, speech recognition, gameplay, robotics, and may employ a deep hierarchy of layers including convolutional layers, where convolution operations occur. It may be noted that CNN is only used for illustrative purposes, the embodiments disclosed herein may be applied to other neural networks that involve convolution operations.

The exemplary neural network 100 illustrated in FIG. 1 comprises a plurality of layers such as a first convolution layer 120 and a first ReLU (Rectified Linear Unit) layer, a first pooling layer 130, a second convolution layer 140 and a second ReLU layer, a second pooling layer 150, a flattening layer 160, and a fully connected (FC) layer 170. This exemplary neural network 100 may be trained to match an alphabet in a given image with a plurality of known alphabet classes. As shown in FIG. 1, an image 110 with a letter is fed into the neural network 100 and transformed through the plurality of layers. The last layer (the FC layer 170) eventually generates a plurality of scores representing the similarity between the letter in the input image 110 and each of the known alphabet classes.

In some embodiments, the input image 110 may be first transformed into an input tensor. As an example, if the input image 110 contains 32*32 pixels and each pixel has three color channels (Red, Green, Blue), its corresponding input tensor may have a size of 32*32*3, with a height as 32, a width as 32, and a depth (e.g., number of channels) as 3. For ease of description, the three dimensional size may be called an HWC format, where H refers to the height of the input tensor (e.g., 32 in the previous image example), W refers to the width of the input tensor (e.g., 32 in the previous image example), and C refers to the number of channels in the input tensor (e.g., 3 in the previous image example). In some cases, if there are multiple input tensors for a convolutional layer (e.g., when there are multiple images input into the convolution layer, or there are multiple input activation tensors received from a previous layer), each input tensor may be represented in an NHWC format, where N refers to an index of the input tensor within the batch of input tensors. In the following description, N may be omitted for simplicity (e.g., assuming there is only one input tensor) unless explicitly stated otherwise. It may be obvious for a person in the art to expand the embodiments to cover the cases with N>1.

In some embodiments, a CNN may include multiple convolution layers (e.g., the first convolution layer 120 and the second convolution layer 140 in FIG. 1). A convolution layer reduces an input tensor (e.g., the original input image, or an input tensor from a previous layer) into a form that is easier to process without losing features that are critical for getting a good prediction/classification. One or more feature detectors, e.g., edge detector, curve detector in image processing, may be involved in the convolution processing in the convolution layer. These feature detectors may be referred to as filters. Each of the filters may have the same number of channels as the input tensor does. For ease of description, this specification uses a term "sharing a plurality of channels" to express that each filter and the input tensor have the same number of channels. For example, the input tensor is a 32*32*3 matrix and an example filter may be a 3*3*3 matrix. A detailed explanation of the convolution processing may refer to the description of FIG. 2.

A convolution layer in a CNN may be followed by a nonlinear activation function to introduce nonlinearity into the CNN. Exemplary nonlinear activation functions include sigmoid, hyperbolic tangent, and rectified linear unit (ReLU). As shown in FIG. 1, a ReLU function (may also be referred to as a ReLU layer) follows each of the convolutional layers 120 and 140. The ReLU function may apply an elementwise activation function to filter out some outputs (activations) generated by the convolution layer 120 or 140. For example, a max(0,x) function may be adopted to filter out all the negative activations in the convolution output and only feed the positive activations to the next layer. A ReLU function may not change the size of the output activation, but limit the number of active neurons, since the negative activations are all zero-ed out, in order to improve the computational efficiency in the following layers.

A CNN may also include one or more pooling layers to provide a variety of computations that reduce the dimensionality of input tensors. In FIG. 1, the first pooling layer 130 and the second pooling layer 150 of the neural network 100 may each perform a down-sampling operation on the input tensor along the spatial dimension (height and width), but usually do not change the depth dimension (e.g., the number of channels).

A fully-connected (FC) layer in a neural network may learn non-linear combinations of high-level features as represented by the output from the previous layer (e.g., a pooling layer 150 in FIG. 1, or a convolution layer) and compute class scores accordingly. Referring to FIG. 1, the output from the pooling layer 150 may be first flattened (e.g., in a flatten layer 160) into a vector, from which an inherent non-learning function in that space may be learned by the FC layer 170 to calculate the final scores for a plurality of classes. Each of the scores may represent a quantified similarity between the alphabet in the input image and the corresponding class.

Figure 2:
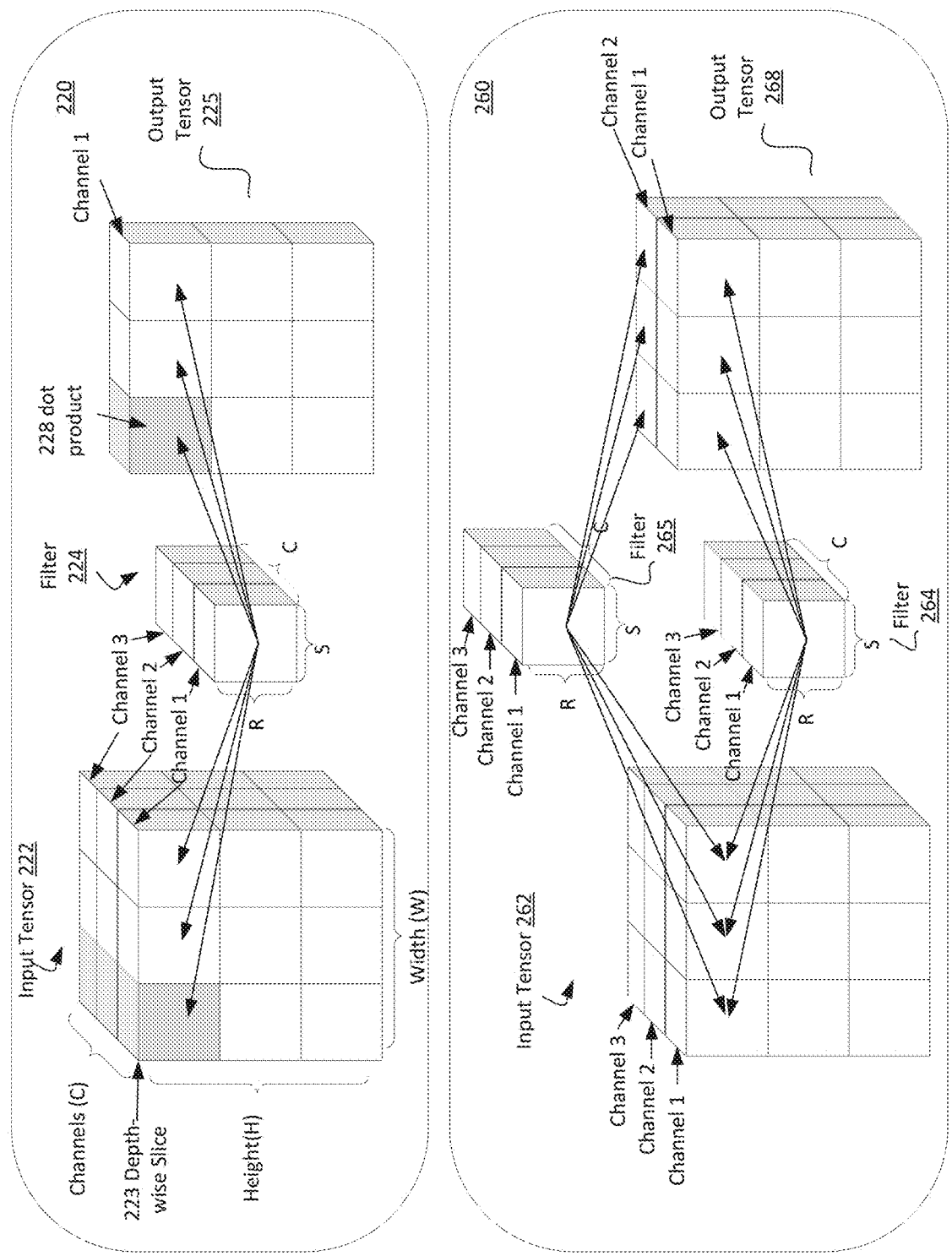
FIG. 2 illustrates exemplary convolution processing in accordance with various embodiments.

FIG. 2 illustrates exemplary convolution processing in accordance with various embodiments. A typical convolution processing in a neural network may start with receiving (or obtaining) one or more input tensors and a plurality of filters, and performing the convolution process to generate one or more output tensors. For simplicity, the exemplary convolution processing 220 in FIG. 2 involves one input tensor 222, one filter 224, and one output tensor 225. The input tensor 222 may be denoted by its height (H), width (W), and number of channels (C). As shown in FIG. 2, the input tensor 222 may be a 3*3*3 matrix, with a height of 3, a width of 3, and a number of channels as 3. The height and the width (e.g., 3(H)*3(W)) of the input tensor 222 in each channel may be referred to as a 2-D input feature map. A tuple of {h, w, c} may point to one element of the 2-D input feature map in channel c. For example, {2,1,1} may point to the element of the 2-D input feature map in channel 1, with a position defined by {2,1} (e.g., height-wise index is 2, and width-wise index is 1). The filter 224 may be denoted by its height (R), width (S), and number of channels (C). In FIG. 2, the filter 224 may be a 1*1*3 matrix. The height and the width (e.g., 1(R)*1(S)) of the filter 224 in each channel may be referred to as a kernel (the filter 224 has three kernels in the three channels, respectively).

In some scenarios, a convolution processing may involve stride and padding. For example, when stride is 1, a filter convolves (e.g., moves, slides) one pixel at a time; and when stride is 2, the filter convolves two pixels at a time as it slides around. A larger stride produces a spatially smaller output tensor (smaller H*W in the output tensor). As another example, when a filter's spatial size (height*width) is greater than 1*1 (e.g., 3*3, or 5*5), the input tensor may pad with zeros around its borders in order to apply the filter and control the spatial size of the output tensor, e.g., to preserve the spatial size of the input tensor so that the input and output height and width are the same. In FIG. 2, it is assumed that no padding is performed to the input tensor 222 and the stride is 1.

During the convolution processing 220 shown in FIG. 2, MAC operations are performed on the filter 224 and each depth-wise slice, such as the first depth-wise slice 223, of the input tensor to generate a dot product, such as the dot product 228. For example, the first depth-wise slice 223 of the input tensor 222 is a 1*1*3 tensor at the top left of the input tensor 222 (the three grey cubes). Both the first depth-wise slice 223 and the filter 224 have a size of 1*1*3. After the MAC operations, the generated dot product 228 may be assembled as a part of the output tensor 225. As such, the output tensor 225 may be determined after the filter 224 convolves (e.g., moves) through all the depth-wise slices in the input tensor 222 (9 slices in FIG. 2). The number of channels in the output tensor 225 equals to the number of filters that have applied during the convolution. Since the convolution processing 220 only uses one filter 224, the corresponding output tensor 228 only has one channel.

In comparison, the convolution processing 260 involves two filters 264 and 265. By convolving the filter 264 through the input tensor 262, the values of the output tensor 268 in the first channel (e.g., a 2-D output feature map in channel 1) may be determined. By convolving the filter 265 through the input tensor 262, the values of the output tensor 268 in the second channel (e.g., a 2-D output feature map in channel 2) may be determined. Accordingly, the resulting output tensor 268 comprises two channels of 2-D output feature maps.

It may be noted that some operations during a convolution processing may be parallelized. For example, MAC operations performed on a filter are independent from the ones of another filter as different filters generate 2-D output feature maps for different output channels. As another example, the depth-wise slices in the input tensors are independent from each other as they generate values for different positions on each 2-D output feature map. The theoretically ideal parallelism may be achieved if all these operations can be parallelized among a plurality of processing entities (e.g., processors, cores, or threads). However, since real-world applications may have a large number of filters and massive input tensors, chasing the theoretically ideal parallelism may require hardware with unattainable computing capacities (e.g., with enormous number of processing entities and memory exchanging mechanism). The embodiments disclosed in the following description provide a method (and corresponding system, storage medium) to achieve the ideal parallelism by fully utilizing the parallel processing capability of a given hardware, which is a more scalable and practical approach.

Figure 3:
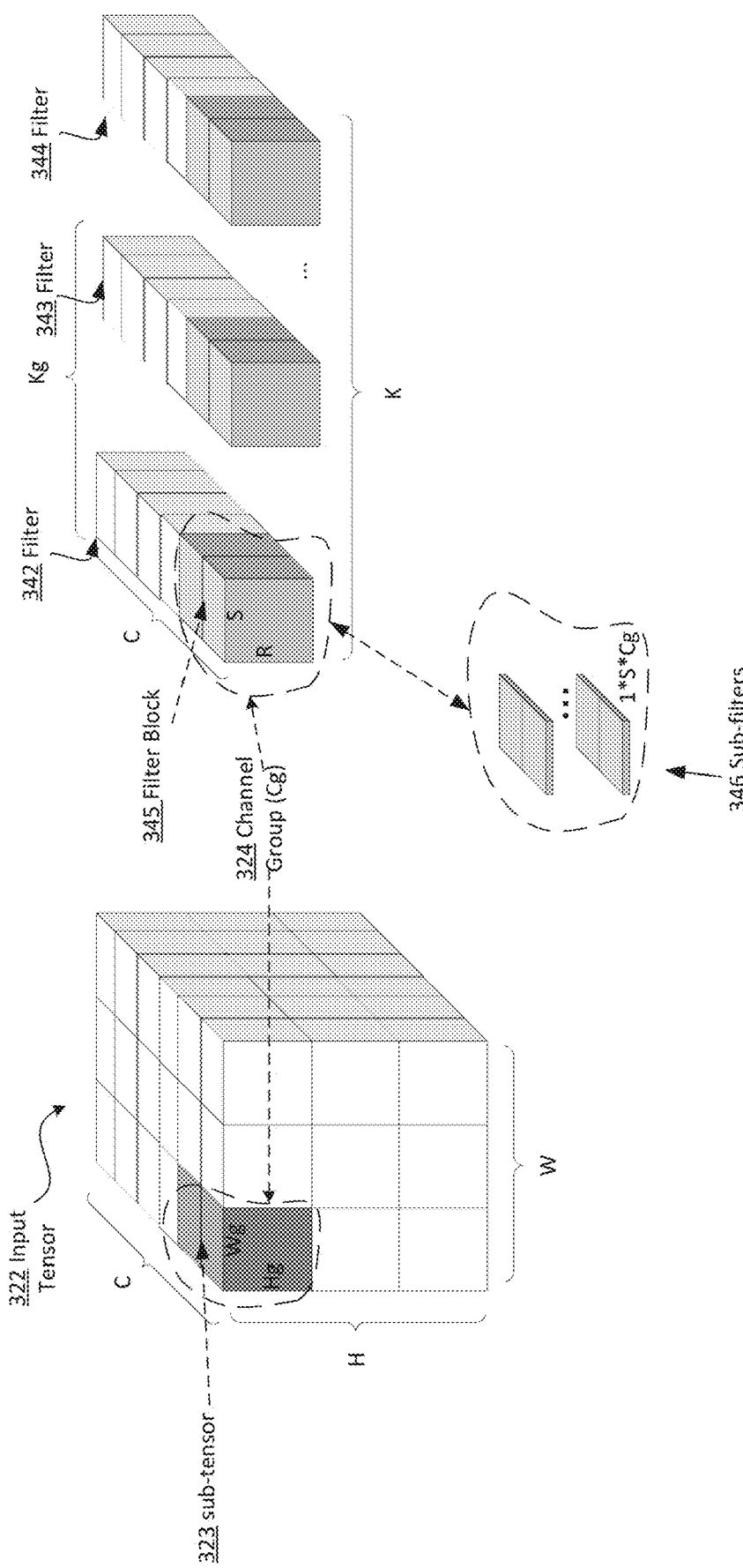
FIG. 3 illustrates an exemplary method for segmenting input tensors and filters in accordance with various embodiments.

FIG. 3 illustrates an exemplary method for segmenting input tensors and filters in accordance with various embodiments. During each convolution process, each input tensor 322 and each filter 342 and 343 share a plurality of channels (i.e., having the same number of channels). Without loss of generality, each input tensor may be represented as a three dimensional tensor, with a height dimension (H), a width dimension (W), and a channel dimension (C); each filter may be similarly represented as a three dimensional tensor, with a height dimension (R), a width dimension (S), and a channel dimension (C). Each dimension may include a plurality of corresponding dimension units. For example, the input tensor 323 in FIG. 3 may be represented as 3(H)*3 (W)*6(C), where the H dimension includes 3 height units, the W dimension includes 3 width units, and the C dimension includes 6 channels. In some embodiments, multiple input tensors may be involved in the convolution process, and the H*W*C representation of each of the multiple input tensors may be expanded with an extra dimension N (e.g., representing an input tensor identifier).

In some embodiments, the input tensor 322 may be segmented into a plurality of sub-tensors 323. For example, the segmentation may guarantee that the plurality of sub-tensors can be equally distributed among the available PEs, so that the workloads on the Pes are evenly distributed. In some embodiments, the size of each sub-tensor may be denoted as Hg*Wg*Cg, where Hg refers to the height-wise dimension of the sub-tensor (e.g., "g" stands for group, and "Hg" stands for a group of height units within a sub-tensor), Wg refers to the width-wise dimension of the sub-tensor, and Cg refers to the channel-wise dimension of the sub-tensor, or a channel group 324 that includes one or more continuous channels. Taking the input tensor 322 in FIG. 3 for an example, the sub-tensor 323 (shaded area) may have a size of 1(Hg)*1(Wg)*2(Cg). In practical implementation, Hg and Wg may be equal and greater than 1, and Cg may be a large positive number such as 8, 16, or 32. In some embodiments, the sub-tensor such as 323 may be fetched by one PE a portion at a time, rather than fetching the entire sub-tensor 323 at once (e.g., due to the limited size of the internal buffer of the PE).

In some embodiments, the filter 342 may be segmented into a plurality of sub-filters, and each of the plurality of sub-tensors and each of the plurality of sub-filters may have a same number of channels, e.g., they may have the channel group Cg 324 in their channel-wise dimension. The segmentation of the filter 342 may be implemented in various ways and with various granularity. For example, the filter 342 may be segmented into filter blocks 345, with each filter block 345 having a size of R*S*Cg and being treated as a sub-filter. As another example, each of the filter block 345 may be further segmented into a plurality of horizontal planes with each having a size of 1*S*Cg and being treated as a sub-filter 346. Assuming the filter 342 has a size of 3(R)*3(S)*C, the sub-filter 346 may have a size of 1(R)*3(S)*Cg, where the number of channels C is divided into multiple channel groups with each having Cg channels.

In some embodiments, the filters 342-344 may be pruned or sparsified to limit the number of non-zero weights therein. The sparsified filters may greatly increase the computational efficiency without significantly losing the accuracy of feature extraction from the input tensor. In some embodiments, the filters 342-344 may be pruned so that each of the sub-filters (e.g., 345 or 346) has either all zero weights or a prefixed number of non-zero weights. The prefixed number of non-zero weights in each sub-filter are used to capture desired features from the input tensor 322, and the all-zero sub-filters are helpful in reducing storage/memory footprint of the filters and computational costs. In some embodiments, the pruning process may be performed in multiple steps. For example, the first step is to prune each of the filter blocks 345 so that they contain the same number of non-zero weights (the positions of the non-zero weights may be different within each filter block 345); then within each filter block 345, the sub-filters 346 therein may be pruned so that they contain the same number of non-zero weights; lastly, some of the sub-filters 346 may have the non-zero weights removed to create all-zero sub-filters.

In some embodiments, a plurality of filters may exist in one convolution layer to capture features in the input tensor 322 from different angles. For example, FIG. 3 shows the filters 342-344 may be used to convolute with the input tensor. In some embodiments, the plurality of filters 342-344 (denoted as K filters) may be divided into filter groups (denoted as Kg), with each filter group comprising a fixed number of filters. Within each filter group, the sub-filters from the same channel group may be formed a sub-filter group, which may be fed into a PE to perform local convolution with a corresponding sub-tensor 323. For example, assuming filter 342 and 343 are in the same filter group, a sub-filter 346 from the first channel group of filter 342 and a sub-filter from the first channel group of filter 343 may form a sub-filter group, which may be fed into a PE to perform convolution with the sub-tensor 323 from the (same) first channel group.

Figure 4:
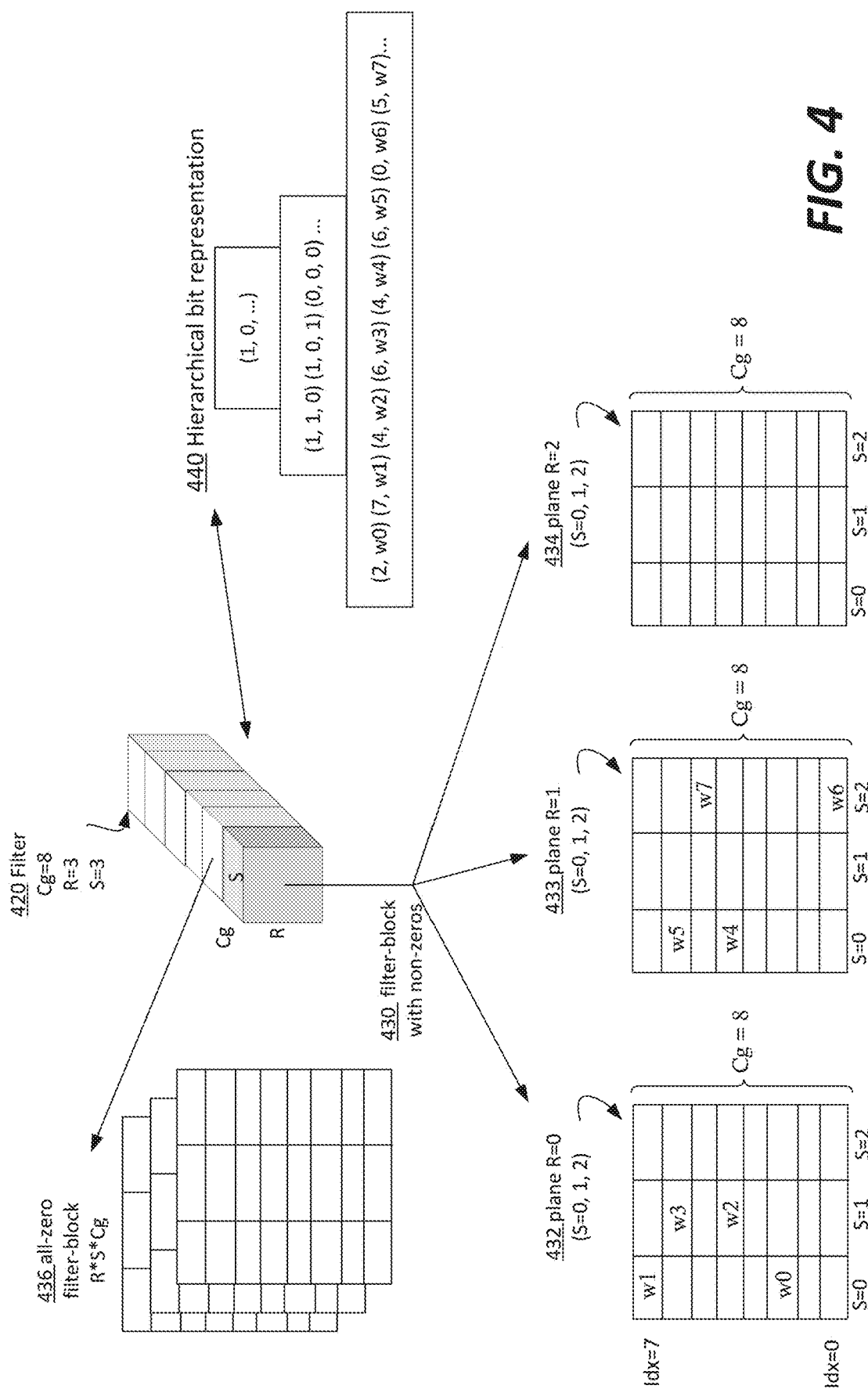
FIG. 4 illustrates an exemplary hierarchical memory layout for storing non-zero weights in accordance with various embodiments.

FIG. 4 illustrates an exemplary hierarchical memory layout for storing non-zero weights in accordance with various embodiments. The exemplary filter 420 in FIG. 4 is presumed as an 3(R)*3(S)*32(C) tensor for illustrative purposes and may refer to one of the filters shown in FIG. 3. It is also presumed that the filter 420 is segmented into a plurality of channel groups, with each channel group comprising a plurality of channels (Cg); and within each channel group, the filter block R*S*Cg is further segmented into a plurality of sub-filters, such as a plurality of horizontal planes, with each being denoted as 1(R)*3(S)*Cg. As shown in FIG. 4, the value for Cg is presumed as 8. These assumptions are merely for the sake of simplicity and clarity, and may be easily revised or relaxed to accommodate different ways of filter segmentations or the actual needs of the convolution.

As shown in FIG. 4, the filter 420 is divided into a plurality of filter blocks, such as the first filter block (the shaded cube) 3(R)*3(S)*8(Cg). The first filter block may be further divided to three horizontal planes 432, 433, and 434 respectively corresponding to R=0, R=1, and R=2. Each of the horizontal planes 432, 433, and 434 may be represented as a two-dimensional table with a width of 3 (corresponding to S) and a height of 8 (corresponding to Cg). It may be noted that each of the sub-filters (horizontal planes) has already been pruned to include either all-zeros (such as 434), or a fixed number of non-zero weights (four non-zero weights in 432 and 433 each). For example, table 432 corresponding to plane R=0 may consist of four non-zero weights W0~W3, with all other values as zeros. Among the non-zero weights, W0 and W1 are located in the column S=0, and W2 and W3 are located in the column S=1. Similarly, the table 433 corresponding to plane R=1 also has four non-zero weights, with W4 and W5 located in column S=0, and W6 and W7 located in column S=2. The table 434 corresponding to plane R=2 does not have non-zero weights.

In FIG. 4, the filter 420 may be stored in memories of the PEs as a hierarchical bit representation to represent the non-zero weights in the filter 420. The hierarchical bit representation of the filter 420 may be generated in various forms depending on the structure of the filter 420. In some embodiments, if the filter has a size of 1(R)*1(S)*C and is segmented into a plurality of filter blocks, each filter block being 1(R)*1(S)*Cg, the hierarchical bit representation of the filter may comprise a first layer and a second layer. The first layer may comprise a plurality of bits corresponding to a plurality of filter blocks in the filter and indicating whether the corresponding filter block has at least one non-zero weight, and the second layer may comprise a plurality of key-value pairs corresponding to the plurality of non-zero weights in the filter, each key-value pair comprising one of the plurality of non-zero weights as value and a channel identifier of the one non-zero weight as key.

In some embodiments, the number of layers in the hierarchical bit representation of the filter 420 may be increased to three if the width and height dimensions of the filter 420 are greater than one. For example, the first layer may comprise a plurality of bits corresponding to a plurality of filter blocks in the filter and indicating whether the corresponding filter block has at least one non-zero weight; the second layer may comprise, for each of the plurality of filter blocks, a plurality of bit-vectors respectively corresponding to a plurality of horizontal planes within the filter block, where each of the bit-vectors indicates whether the corresponding horizontal plane has at least one non-zero weight; and the third layer may comprise a plurality of key-value pairs corresponding to the plurality of non-zero weights in the filter, each key-value pair comprising one of the plurality of non-zero weights as value and a channel identifier of the one non-zero weight as key.

For example, assuming the filter 420 has a first filter block (the shaded cube) with some non-zero weights and a second filter block with all zero weights, the hierarchical bit representation 440 for filter 420 may be constructed as shown in FIG. 4. The first layer of the hierarchical bit representation 440 comprises a plurality of bits indicating whether the corresponding filter block contains at least one non-zero weight. In this example, the first bit corresponding to the first filter block is 1, and the second bit corresponding to the second filter block is 0 (indicating an all-zero filter block). The second layer of the hierarchical bit representation 440 comprises a plurality of bit-vectors corresponding to the horizontal planes of the filter blocks that have at least one non-zero weights. In this example, the first filter block has three horizontal planes represented as tables 432, 433, and 434, where table 432 contains non-zero weights in columns 0 and 1, table 433 contains non-zero weights in columns 0 and 2, and table 434 contains all zeros. Accordingly, the first bit-vector in the second layer of the hierarchical bit representation 440 has values (1, 1, 0) indicating that the first horizontal plane (R=0) has non-zero weights in the first column (S=0) and the second column (S=1); the second bit-vector in the second layer of the hierarchical bit representation 440 has values (1, 0, 1) indicating that the second horizontal plane (R=1) has non-zero weights in the first column (S=0) and the third column (S=2); and the third bit-vector in the second layer of the hierarchical bit representation 440 has values (0, 0, 0) indicating there is no non-zero value in the corresponding horizontal plane (R=2). The third layer of the hierarchical bit representation 440 may include the actual non-zero values. As shown in FIG. 4, the non-zero weight W0 is located in channel 2 (the idx values in table 432 refer to the indexes of the channels, which starts from 0), thus the key-value pair corresponding to W0 in the third layer is (2, W0). Similarly, the non-zero weight W1 is represented as (7, W1), indicating the non-zero weight W1 is located in channel 7.

The hierarchical bit representation 440 stores the necessary information of the non-zero weights in the filter 420 in an efficient way. In some embodiments, the hierarchical bit representation 440 may provide the exact location of each non-zero weight by: determining a channel group index based on the first layer of the hierarchical bit representation 440, wherein the channel group index corresponds to a filter channel group in which the non-zero weight is located; determining a height index and a width index of the non-zero weight based on the second layer of the hierarchical bit representation; and determining an offset of the non-zero weight within the filter channel group (i.e., the channel index) based on the third layer of the hierarchical bit representation 440.

During the convolution process, each of a plurality of processing entities (PE) may be assigned with one or more filters (e.g., a filter group) or one or more filter blocks (e.g., from the same channel group), and one or more corresponding sub-tensors (e.g., a portion of an input tensor from the same channel group as the filters/filter blocks) to perform local Multiplication-and-Accumulation (MAC) operations to generate partial sums.

In order to perform the MAC operations on each of the PEs, the input values (in the sub-tensors) corresponding to the assigned non-zero weights (in the filters or filter blocks) may be identified based on the hierarchical bit representations of the one or more filters or filter blocks. The following description uses the exemplary hierarchical bit representation of filter 420 as an example to demonstrate how the corresponding input values are identified. It is assumed in FIG. 4 that the filter 420 is assigned to a PE. Each of the non-zero weights in the filter 420 may be enumerated and multiplied with a corresponding input value in the input tensor. For example, the PE may start from the first layer by identifying a first non-zero value bit, which indicates a filter block with non-zero weights. The position of the non-zero value bit may indicate which channel group it corresponds to. In FIG. 4, the first bit of the first layer is 1, which means the filter block of the first channel group has at least one non-zero weights. The PE may then check the second layer by locating a fixed number of bit-vectors corresponding to the filter block, where the fixed number refers to the number of horizontal planes in each filter block (e.g., 3 horizontal planes 432, 433, and 434 in the first filter block in FIG. 4). Each of these bit-vectors may include a fixed number of bits, which respectively correspond to the number of columns in the S dimension of the filter 420 (e.g., 3 columns S=0, 1, 2 in each horizontal plane 432, 433, or 434). Based on the position of the bit-vector in the second layer, the index in the R dimension may be determined; based on the bit values within the bit-vector, the index in the S dimension may be determined. At last, the third layer includes the channel identifiers and the actual non-zero weights. By knowing the three indexes in the R dimension, S dimension, and channel dimension, the PE may locate the corresponding input value from the input tensor and perform the MAC operation based on the non-zero weight and the input value to obtain a partial sum. The partial sum obtained by the plurality of PEs may be accumulated to construct an output tensor of the convolution layer.

In some embodiments, each of the layers in the hierarchical bit representation 440 may maintain a pointer pointing to the previously processed bit, bit-vector, or key-value pair. During the enumeration of the non-zero weights, the pointers may help the PEs to determine the next filter block, bit-vector, or key-value pair to process. In some embodiments, the hierarchical bit representation 440 may be stored as a tree, with the root node corresponding to the first layer. Each of the non-zero bits in the root node may have a sub-tree including one or more child nodes storing the bit-vectors belonging to the filter block corresponding to the non-zero bit, where each of the bit-vectors correspond to a horizontal plane in the filter block. Each of the non-zero bits in each bit-vector may have one or more grandchild nodes corresponding to the one or more columns in each horizontal plane of the filter block and storing key-value pairs of the non-zero weights in one or more columns.

The hierarchical bit representation 440 provides an efficient way to store the non-zero weights with all the information necessary to locate corresponding input values to perform convolution. For example, if a bit in the first layer is 0, the corresponding filter block may be skipped as a whole. In this case, the entire filter block only takes 1 bit of storage space in the PE.

Figure 5:
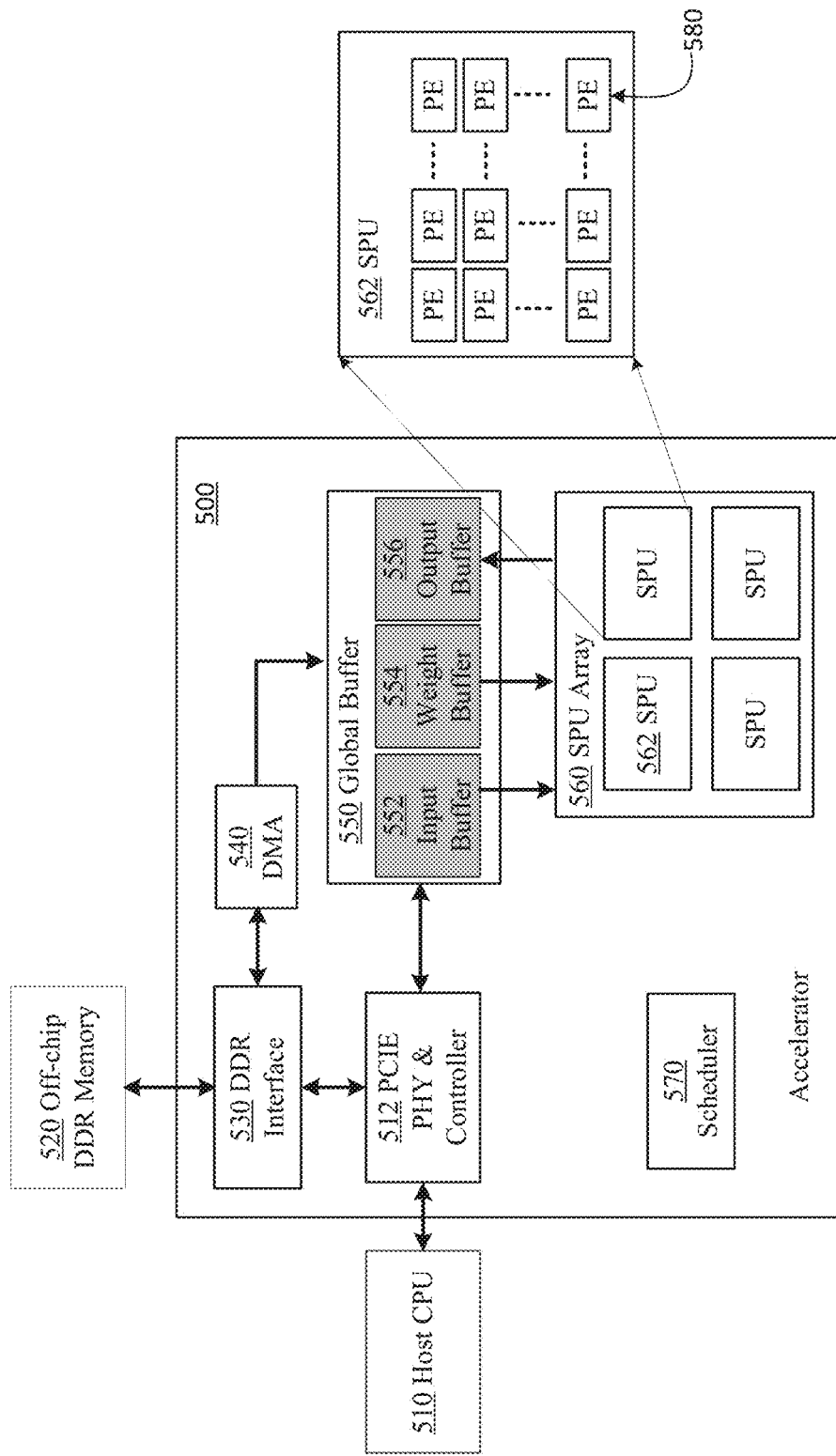
FIG. 5 illustrates an exemplary system diagram for hierarchical weight-sparse convolution in accordance with various embodiments.

FIG. 5 illustrates an exemplary system diagram for hierarchical weight-sparse convolution processing in accordance with various embodiments. The architecture shown in FIG. 5 comprises a computer system designed to perform inferences when a neural network is loaded and runs. In some embodiments, such a computer system is implemented as a hardware accelerator 500. Some components in the hardware accelerator 500 may collaborate in a specific way to improve the throughput and energy efficiency of neural networks by facilitating parallel convolution computations on a plurality of processing entities. The accelerator 500 is merely illustrative and may comprise more, fewer, or alternative components. The hardware accelerator 500 may be designed as a reconfigurable device such as a field-programmable gate array (FPGA) or an application-specific integrated circuit (ASIC).

As shown in FIG. 5, the hardware accelerator 500 may comprise a scheduler 570 to control the workflow within the accelerator 500 and interactions with off-chip components such as a host CPU 510 and double data rate (DDR) memories 520. For example, the accelerator 500 may interact with the host CPU 510 through a peripheral component interconnect express (PCIe) physical layer (PHY) controller 512, and an off-chip DDR memory 520 through a DDR interface 530. The accelerator 500 may fetch data from the off-chip DDR memory 520 through a direct memory access (DMA) controller 540 that communicates with the off-chip DDR memory 520 via the DDR interface 530. The fetched data may be stored in an on-chip buffer, called global buffer 550, to prepare for parallel convolution computations. The global buffer 550 may be logically divided into multiple sections, such as an input buffer 552, a weight buffer 554, and an output buffer 556. The input buffer 552 may store data associated with input tensors, the weight buffer 554 may store data associated with filters, and the output buffer 556 may store data associated with results of convolution computations (e.g., output tensors). The global buffer 550 may exchange data with an array 560 of Sparse Processing Unit (SPU) 562 to perform convolution computations. The "sparse" in the name of SPU indicates that the SPU array 560 is specifically designed to efficiently perform convolution computations involving sparsity (e.g., sparse input tensors, and/or sparse filters). Each of the SPU 562 may comprise a plurality of processing entities (PE) 580, where each PE 580 may handle a unit amount of convolution computation.

Figure 6A:
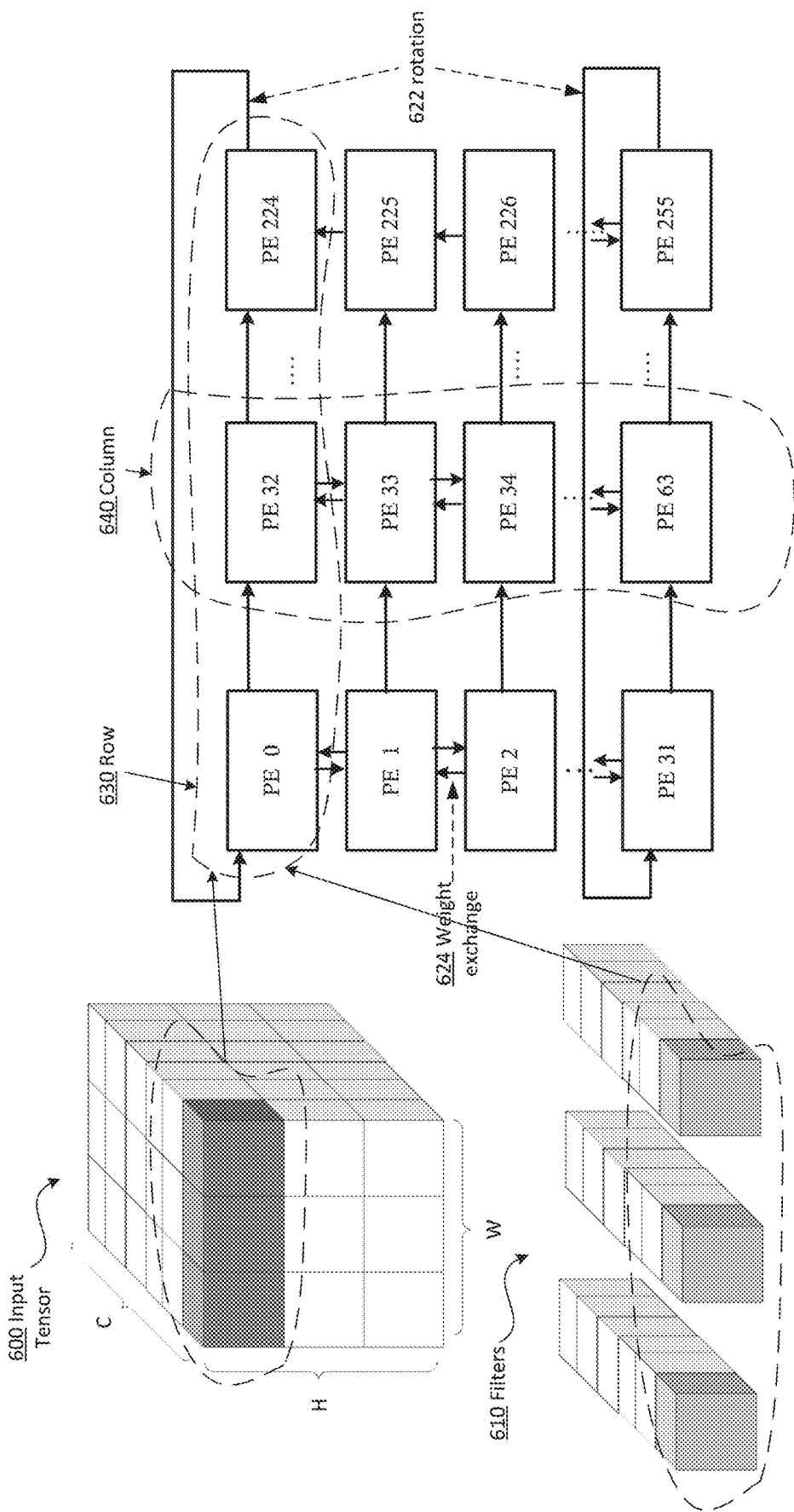
FIG. 6A illustrates an exemplary system architecture for hierarchical weight-sparse convolution in accordance with various embodiments.

FIG. 6A illustrates an exemplary diagram for hierarchical weight-sparse convolution in accordance with various embodiments. For illustrative purposes, FIG. 6A shows how a sub-tensor (the shaded portion in the input tensor 600) and the sub-filter group (the shaded portion in the filters 610) are assigned to the plurality of PEs to carry out the convolution in parallel.

In some embodiments, the plurality of PEs may be arranged in a matrix with a plurality of rows and columns of PEs. Each of the plurality of PEs may be allowed to exchanged data with its neighboring PEs (e.g., reading non-zero weights from an internal buffer of one of its column-wise neighboring PE, or rotating the partial sum results among its row-wise neighboring PEs).

In some embodiments, the input tensor 600 (an H*W*C tensor) may first be segmented into a plurality of sub-tensors, e.g., a plurality of W*Cg sub-tensors (e.g., a plurality of horizontal planes in the input tensor 600), where Cg refers to a channel group including a plurality of channels. These sub-tensors may then be assigned to the plurality of PEs, or storing in the internal buffers of the plurality of PEs.

As shown in FIG. 6A, each row of PEs (e.g., PE0, PE 32, . . . PE 224 of the first row 630) may be assigned with a portion of the W*Cg sub-tensor. Each PE may then individually go through the horizontal planes in the filters (e.g., S*Cg) to enumerate all the non-zero weights. For each non-zero weight that is identified, the channel dimension index, the R dimension index, and the S dimension index of the non-zero weight may be easily deducted from the corresponding hierarchical bit representation, and the PE may then easily locate the corresponding input value from the assigned sub-tensor based on three indexes. The non-zero weight and the corresponding input value may be multiplied and accumulated to generate a partial sum. The PE may skip the entire filter block or individual channel groups if the corresponding bit is 0. In some embodiments, each PE may, if necessary, read more non-zero weights from its neighboring PEs through the weight exchange connection 624 between every two PEs in the same column 640. In some embodiments, when the slowest PE in the same row 630 finishes enumerating all the assigned non-zero weights, the partial sums generated by each PE in the same row 630 may be rotated through the rotation connection 622 for the next round of processing (e.g., these partial sums may be accumulated further with the new partial sums generated in the next round). Here, the "slowest PE" may refer to the PE with the smallest computing capacity, or with the heaviest workload (e.g., most non-zero weights to process). In some embodiments, these partial sums may be accumulated to construct the output tensor of the convolution layer.

The exemplary assignment of the filters and input tensor shown in FIG. 6A may offer the following benefits for convolution processes in neural networks: potentially saving computing time if any slowest PE in a row can reduce compute time, and definitely saving power by skipping memory access and multiplication (avoiding the all-zero portions of the filters).

Figure 6B:
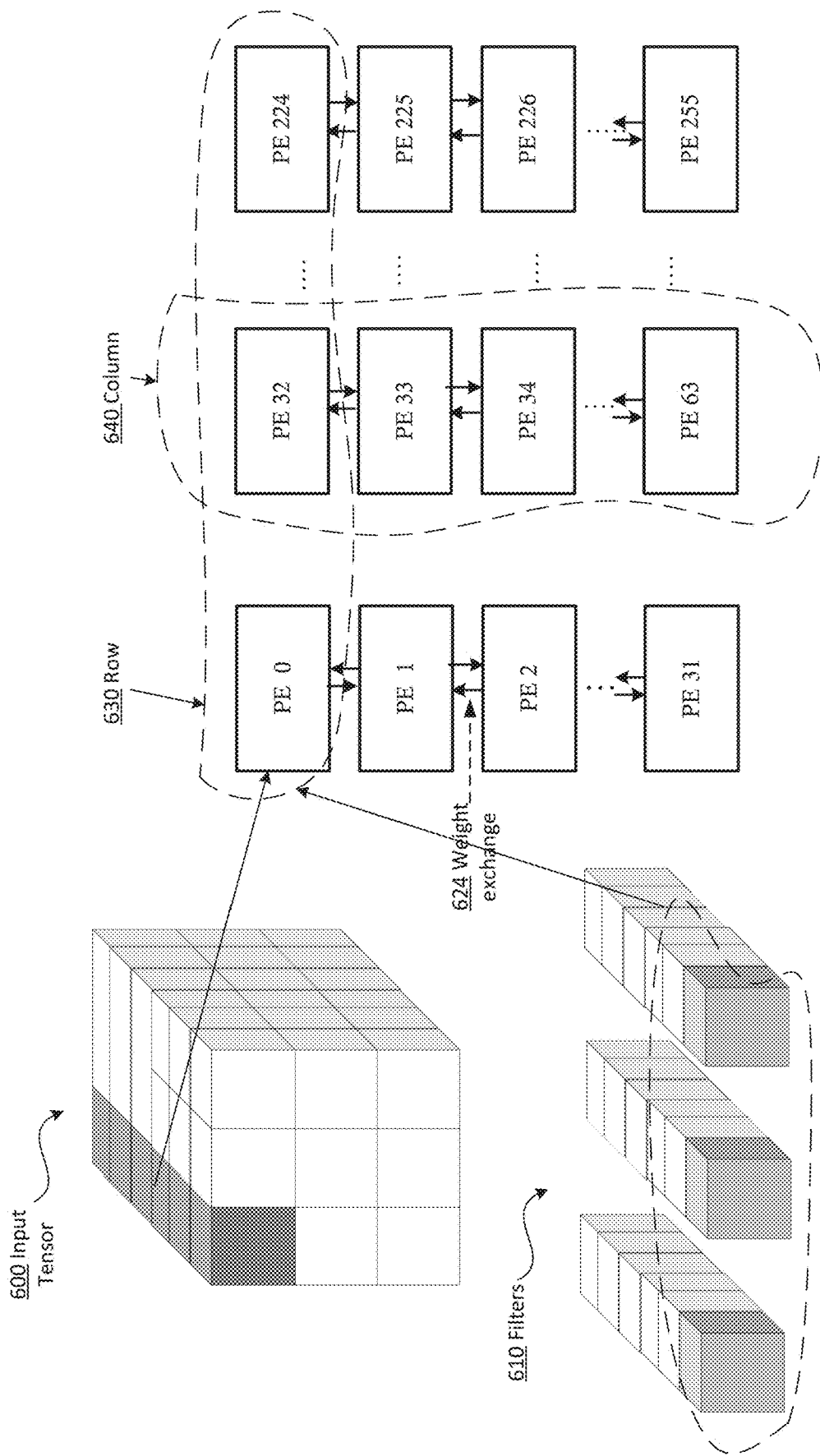
FIG. 6B illustrates another exemplary system architecture for hierarchical weight-sparse convolution in accordance with various embodiments.

FIG. 6B illustrates another exemplary diagram for hierarchical weight-sparse convolution in accordance with various embodiments. In FIG. 6B, the input tensor 600 and the filters 610 are segmented and assigned to the plurality of PEs in a same way as the assignment shown in FIG. 6A. For example, each PE may, if necessary, read from its column-wise neighboring PEs through the weight exchange connection 624 for more non-zero weights. The difference between these two diagrams in FIGS. 6A and 6B is that, each PE continues to go through all the S*Cg of the filters 610 until the final result of the corresponding output channel is calculated. This way, the partial sums may not need to be rotated among the PEs in the same row. In some embodiments, these partial sums may be accumulated to construct the output tensor of the convolution layer.

The exemplary assignment of the filters and input tensor shown in FIG. 6B may offer the following benefits for convolution processes in neural networks: saving computation time since one PE may skip computation for the whole output channel computation, and saving power for skipping memory access and multiplication.

Figure 7:
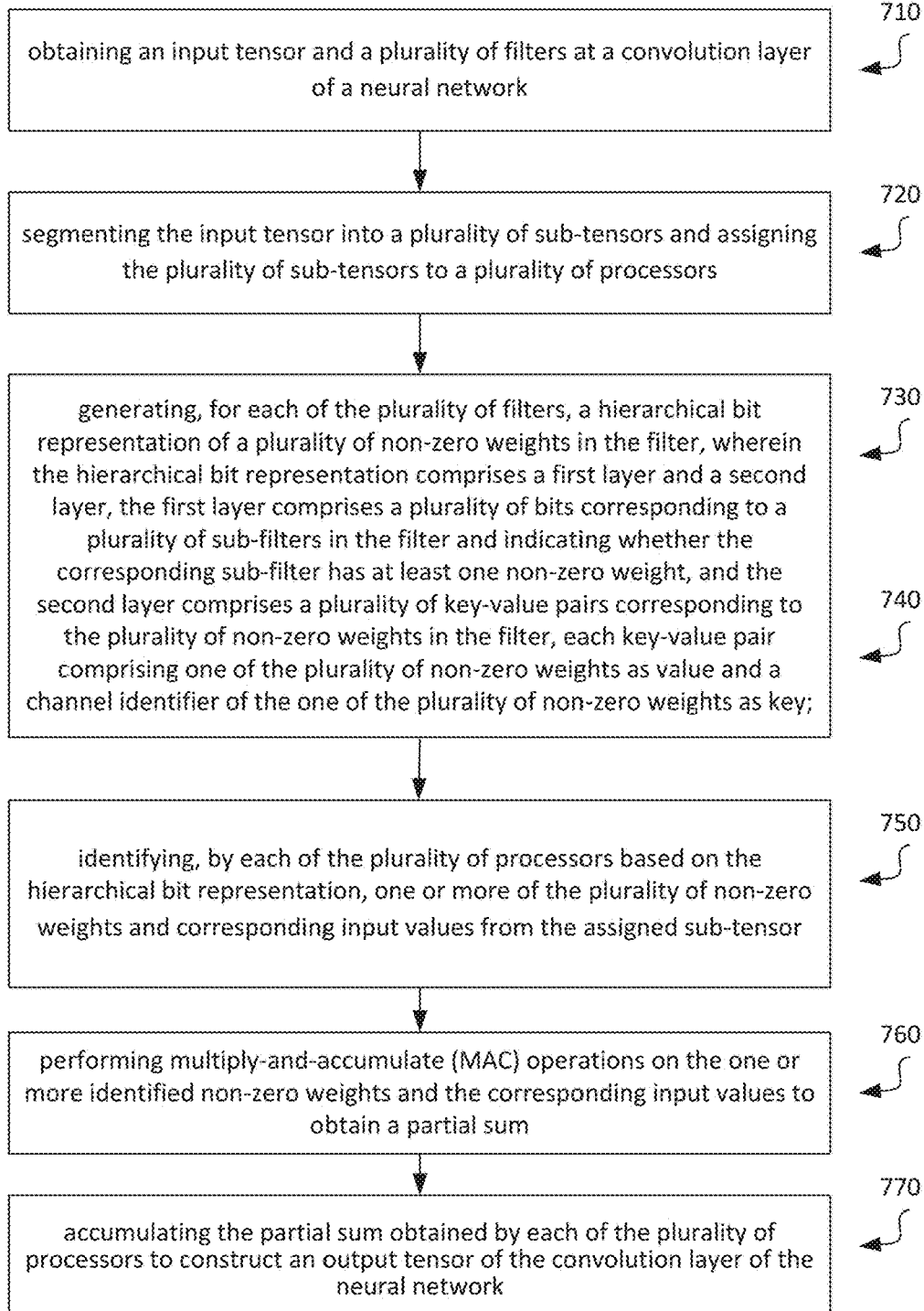
FIG. 7 illustrates an example method for hierarchical weight-sparse convolution in accordance with various embodiments.

FIG. 7 illustrates an example method for hierarchical weight-sparse convolution in accordance with various embodiments. The method 700 may be performed by a device, apparatus, or system for optimizing resource allocation. The method 700 may be performed by one or more modules/components of the environment or system illustrated by FIGS. 1-6, such as the hardware accelerator 500 in FIG. 5. The operations of the method 700 presented below are intended to be illustrative. Depending on the implementation, the method 700 may include additional, fewer, or alternative steps performed in various orders or in parallel.

Block 710 includes obtaining an input tensor and a plurality of filters at a convolution layer of a neural network. In some embodiments, the plurality of filters are pruned so that each of the plurality of sub-filters has either all zero weights or a prefixed number of non-zero weights.

Blocks 720 includes segmenting the input tensor into a plurality of sub-tensors and assigning the plurality of sub-tensors to a plurality of processors. In some embodiments, the assigning the plurality of sub-tensors to a plurality of processors comprises: for each of the plurality of processors, storing one or more of the plurality of sub-tensors into an internal buffer of the processor.

Blocks 730 includes generating, for each of the plurality of filters, a hierarchical bit representation of a plurality of non-zero weights in the filter, wherein the hierarchical bit representation comprises a first layer and a second layer, the first layer comprises a plurality of bits corresponding to a plurality of sub-filters in the filter and indicating whether the corresponding sub-filter has at least one non-zero weight, and the second layer comprises a plurality of key-value pairs corresponding to the plurality of non-zero weights in the filter, each key-value pair comprising one of the plurality of non-zero weights as value and a channel identifier of the one of the plurality of non-zero weights as key. In some embodiments, each of the plurality of sub-tensors and each of the plurality of sub-filters have a same number of channels.

Blocks 740 includes identifying, by each of the plurality of processors based on the hierarchical bit representation, one or more of the plurality of non-zero weights and corresponding input values from the assigned sub-tensor. In some embodiments, the identifying one or more of the plurality of non-zero weights and corresponding input values from the assigned sub-tensor based on the hierarchical bit representation comprises: for each of the plurality of non-zero weights, determining a channel group index based on the first layer of the hierarchical bit representation, wherein the channel group index corresponds to a filter channel group in which the non-zero weight is located; determining an offset of the non-zero weight within the filter channel group based on the second layer of the hierarchical bit representation; identifying an input value from the assigned sub-tensor based on the channel group index and the offset.

In some embodiments, the hierarchical bit representation further comprises a third layer between the first layer and the second layer, wherein the third layer comprises, for each of the plurality of sub-filters, a plurality of bit-vectors respectively corresponding to a plurality of horizontal planes of the sub-filter, and each of the plurality of bit-vectors indicates whether the corresponding horizontal plane comprises at least one of the plurality of non-zero weights. In some embodiments, the identifying one or more of the plurality of non-zero weights and corresponding input values from the assigned sub-tensor based on the hierarchical bit representation comprises: for each of the plurality of non-zero weights, determining a channel group index based on the first layer of the hierarchical bit representation, wherein the channel group index corresponds to a filter channel group in which the non-zero weight is located; determining a height index and a width index of the non-zero weight based on the third layer of the hierarchical bit representation; determining an offset of the non-zero weight within the filter channel group based on the second layer of the hierarchical bit representation; identifying an input value from the assigned sub-tensor based on the channel group index, the height index, the width index, and the offset.

Blocks 750 includes performing multiply-and-accumulate (MAC) operations on the one or more identified non-zero weights and the corresponding input values to obtain a partial sum.

Blocks 760 includes accumulating the partial sum obtained by each of the plurality of processors to construct an output tensor of the convolution layer of the neural network.

In some embodiments, the plurality of processors are electrically arranged into a matrix comprising a plurality of rows and columns, and each of the plurality of processors has one or more column-wise neighboring processors. In some embodiments, each of the plurality of processors is allowed to read one or more key-value pairs from an internal buffer of one of its column-wise neighboring processors. In some embodiments, the method 700 may further comprise assigning one or more of the plurality of sub-tensors from a channel group to a row of processors, wherein the channel group comprises a plurality of channels; and after each of the row of processors finishes the MAC operations between one sub-tensor and a corresponding sub-filter based on the hierarchical bit representation and obtaining a partial sum, rotating the partial sums among the row of processors. In some embodiments, the method 700 may further comprise assigning one or more of the plurality of sub-filters from a same height index and a same weight index to each of the plurality of processors; and after each of the plurality of processors finishes the MAC operations between the one or more of the plurality of sub-filters with corresponding sub-filters based on the hierarchical bit representation and obtaining a partial sum, accumulating the partial sums to construct the output tensor.

Figure 8:
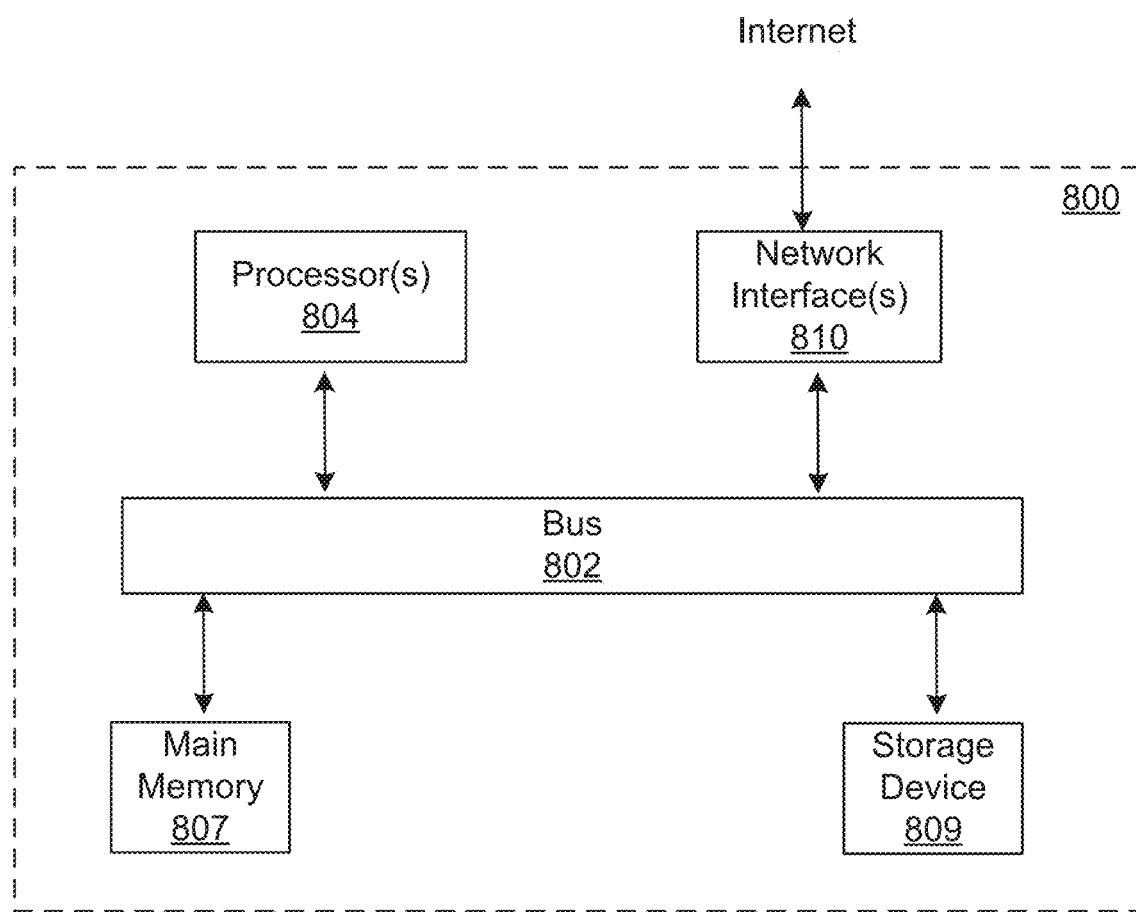
FIG. 8 illustrates an example computer system in which any of the embodiments described herein may be implemented.

FIG. 8 illustrates an example computing device in which any of the embodiments described herein may be implemented. The computing device may be used to implement one or more components of the systems and the methods shown in FIGS. 1-7. The computing device 800 may comprise a bus 802 or other communication mechanisms for communicating information and one or more hardware processors 804 coupled with bus 802 for processing information. Hardware processor(s) 804 may be, for example, one or more general purpose microprocessors.

The computing device 800 may also include a main memory 807, such as a random-access memory (RAM), cache and/or other dynamic storage devices, coupled to bus 802 for storing information and instructions to be executed by processor(s) 804. Main memory 807 also may be used for storing temporary variables or other intermediate information during execution of instructions to be executed by processor(s) 804. Such instructions, when stored in storage media accessible to processor(s) 804, may render computing device 800 into a special-purpose machine that is customized to perform the operations specified in the instructions. Main memory 807 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 800 may implement the techniques described herein using customized hard-wired logic, one or more ASICs or FPGAs, firmware and/or program logic which in combination with the computing device may cause or program computing device 800 to be a special-purpose machine. According to one embodiment, the techniques herein are performed by computing device 800 in response to processor(s) 804 executing one or more sequences of one or more instructions contained in main memory 807. Such instructions may be read into main memory 807 from another storage medium, such as storage device 809. Execution of the sequences of instructions contained in main memory 807 may cause processor(s) 804 to perform the process steps described herein. For example, the processes/methods disclosed herein may be implemented by computer program instructions stored in main memory 807. When these instructions are executed by processor(s) 804, they may perform the steps as shown in corresponding figures and described above. In alternative embodiments, hard-wired circuitry may be used in place of or in combination with software instructions.

The computing device 800 also includes a communication interface 810 coupled to bus 802. Communication interface 810 may provide a two-way data communication coupling to one or more network links that are connected to one or more networks. As another example, communication interface 810 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer-readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A computer-implemented method, comprising:
   obtaining an input tensor and a filter at a convolution layer of a neural network;
   segmenting the filter into a plurality of sub-filters;
   generating a hierarchical bit representation of the filter representing a plurality of non-zero weights in the filter, wherein the hierarchical bit representation comprises a first layer, the first layer comprising a plurality of bits respectively corresponding to the plurality of sub-filters in the filter, each of the plurality of bits indicating whether the corresponding sub-filter includes at least one non-zero weight; and
   performing multiply-and-accumulate (MAC) operations based on the hierarchical bit representation of the filter and the input tensor.

2. The method of claim 1, wherein the performing MAC operations comprises:
   identifying, based on the hierarchical bit representation, one or more of the plurality of non-zero weights in the filter and corresponding input values in the input tensor; and
   performing MAC operations on the one or more identified non-zero weights and the corresponding input values.

3. The method of claim 1, wherein the hierarchical bit representation further comprises a second layer, the second layer comprising a plurality of key-value pairs respectively corresponding to the plurality of non-zero weights in the filter, each key-value pair comprising one of the plurality of non-zero weights as value and a channel identifier of the one of the plurality of non-zero weights as key.

4. The method of claim 3, wherein the performing MAC operations comprises:
   for each of the plurality of non-zero weights, determining a channel group index based on the first layer of the hierarchical bit representation, wherein the channel group index corresponds to a filter channel group in which the non-zero weight is located;
   determining an offset of the non-zero weight within the filter channel group based on the second layer of the hierarchical bit representation;
   identifying an input value in the input tensor based on the channel group index and the offset; and
   performing an MAC operation based on the identified input value and the non-zero weight.

5. The method of claim 3, wherein the hierarchical bit representation further comprises a third layer, the third layer comprising a plurality of bit-vectors respectively corresponding to a plurality of horizontal planes in each of the plurality of sub-filters, wherein each of the plurality of bit-vectors indicates whether the corresponding horizontal plane comprises at least one of the plurality of non-zero weights.

6. The method of claim 5, wherein the performing MAC operations comprises:
for each of the plurality of non-zero weights, determining a channel group index based on the first layer of the hierarchical bit representation, wherein the channel group index corresponds to a filter channel group in which the non-zero weight is located;
determining a height index and a width index of the non-zero weight based on the third layer of the hierarchical bit representation;
determining an offset of the non-zero weight within the filter channel group based on the second layer of the hierarchical bit representation;
identifying an input value in the input tensor based on the channel group index, the height index, the width index, and the offset; and
performing an MAC operation based on the identified input value and the non-zero weight.

7. The method of claim 1, further comprising:
pruning the filter to make each of the plurality of sub-filters has either all zero weights or a prefixed number of non-zero weights.

8. The method of claim 1, further comprising:
obtaining a plurality of partial sums from the MAC operations; and
constructing an output tensor of the convolution layer of the neural network based on the plurality of partial sums.

9. The method of claim 1, wherein the MAC operations are parallel processed among a plurality of processors.

10. The method of claim 1, further comprising:
segmenting the input tensor into a plurality of sub-tensors, wherein each of the plurality of sub-tensors and each of the plurality of sub-filters have a same number of channels, and
the performing MAC operations comprises:
assigning the plurality of sub-tensors and the plurality of sub-filters to a plurality of processors for parallelly performing MAC operations.

11. A system for hierarchical weight-sparse convolution processing, comprising one or more processors and one or more non-transitory computer-readable memories coupled to the one or more processors and configured with instructions executable by the one or more processors to cause the system to perform operations comprising:
obtaining an input tensor and a filter at a convolution layer of a neural network;
segmenting the filter into a plurality of sub-filters;
generating a hierarchical bit representation of the filter representing a plurality of non-zero weights in the filter, wherein the hierarchical bit representation comprises a first layer, the first layer comprising a plurality of bits respectively corresponding to the plurality of sub-filters in the filter, each of the plurality of bits indicating whether the corresponding sub-filter includes at least one non-zero weight; and
performing multiply-and-accumulate (MAC) operations based on the hierarchical bit representation of the filter and the input tensor.

12. The system of claim 11, wherein the performing MAC operations comprises:
identifying, based on the hierarchical bit representation, one or more of the plurality of non-zero weights in the filter and corresponding input values in the input tensor; and
performing MAC operations on the one or more identified non-zero weights and the corresponding input values.

13. The system of claim 11, wherein the hierarchical bit representation further comprises a second layer, the second layer comprising a plurality of key-value pairs respectively corresponding to the plurality of non-zero weights in the filter, each key-value pair comprising one of the plurality of non-zero weights as value and a channel identifier of the one of the plurality of non-zero weights as key.

14. The system of claim 13, wherein the performing MAC operations comprises:
for each of the plurality of non-zero weights, determining a channel group index based on the first layer of the hierarchical bit representation, wherein the channel group index corresponds to a filter channel group in which the non-zero weight is located;
determining an offset of the non-zero weight within the filter channel group based on the second layer of the hierarchical bit representation;
identifying an input value in the input tensor based on the channel group index and the offset; and
performing an MAC operation based on the identified input value and the non-zero weight.

15. The system of claim 13, wherein the hierarchical bit representation further comprises a third layer, the third layer comprising a plurality of bit-vectors respectively corresponding to a plurality of horizontal planes in each of the plurality of sub-filters, wherein each of the plurality of bit-vectors indicates whether the corresponding horizontal plane comprises at least one of the plurality of non-zero weights.

16. A non-transitory computer-readable storage medium for hierarchical weight-sparse convolution processing, configured with instructions executable by one or more processors to cause the one or more processors to perform operations comprising:
obtaining an input tensor and a filter at a convolution layer of a neural network;
segmenting the filter into a plurality of sub-filters;
generating a hierarchical bit representation of the filter representing a plurality of non-zero weights in the filter, wherein the hierarchical bit representation comprises a first layer, the first layer comprising a plurality of bits respectively corresponding to the plurality of sub-filters in the filter, each of the plurality of bits indicating whether the corresponding sub-filter includes at least one non-zero weight; and
performing multiply-and-accumulate (MAC) operations based on the hierarchical bit representation of the filter and the input tensor.

17. The non-transitory computer-readable storage medium of claim 16, wherein the performing MAC operations comprises:
identifying, based on the hierarchical bit representation, one or more of the plurality of non-zero weights in the filter and corresponding input values in the input tensor; and
performing MAC operations on the one or more identified non-zero weights and the corresponding input values.

18. The non-transitory computer-readable storage medium of claim 16, wherein the hierarchical bit representation further comprises a second layer, the second layer comprising a plurality of key-value pairs respectively corresponding to the plurality of non-zero weights in the filter, each key-value pair comprising one of the plurality of non-zero weights as value and a channel identifier of the one of the plurality of non-zero weights as key.

19. The non-transitory computer-readable storage medium of claim 18, wherein the performing MAC operations comprises:
- for each of the plurality of non-zero weights, determining a channel group index based on the first layer of the hierarchical bit representation, wherein the channel group index corresponds to a filter channel group in which the non-zero weight is located;
- determining an offset of the non-zero weight within the filter channel group based on the second layer of the hierarchical bit representation;
- identifying an input value in the input tensor based on the channel group index and the offset; and
- performing an MAC operation based on the identified input value and the non-zero weight.

20. The non-transitory computer-readable storage medium of claim 18, wherein the hierarchical bit representation further comprises a third layer, the third layer comprising a plurality of bit-vectors respectively corresponding to a plurality of horizontal planes in each of the plurality of sub-filters, wherein each of the plurality of bit-vectors indicates whether the corresponding horizontal plane comprises at least one of the plurality of non-zero weights.

* * * * *